Patented Apr. 1, 1930

1,753,059

UNITED STATES PATENT OFFICE

HUMPHREY DESMOND MURRAY, OF LONDON, ENGLAND, ASSIGNOR OF ONE-HALF TO NORTON AND GREGORY LIMITED, OF LONDON, ENGLAND

PRODUCTION OF PHOTOGRAPHIC IMAGES

No Drawing. Application filed September 14, 1929, Serial No. 392,744, and in Great Britain July 14, 1928.

It is well known that light-sensitive diazo compounds can be used for preparing positive photo-copying media such as papers. The diazo compound which may be coated on a suitable support is exposed to light beneath a design of some kind, such as a tracing, whereby the light-sensitive compound which is unprotected by the design suffers decomposition and hence loses its power of coupling with an azo-dyestuff coupling component.

After the exposure, therefore, the paper or the like may be treated with a suitable solution of a coupling component, whereby a replica of the original tracing is obtained as a coloured dye image on a more or less white ground.

The coupling solutions commonly employed usually contain a non-volatile alkali and as the dye image prints are seldom washed with water, an excess of alkali and of the coupling component remains on the surface of the paper; and after a variable period of time, dependent upon the particular compounds used, the background of such prints discolours, possibly owing to oxidation of excess of the coupling component in the presence of the alkali. The present invention has for its object to obviate or reduce such disadvantage and to provide an improved manufacture of prints of the type described.

According to the present invention, the aforesaid colour deterioration is retarded or rendered practically negligible by treatment of the diazo-type paper or the like with an inorganic reducing agent.

The reducing agent may be in the solution used for developing, or may be applied subsequently to the development, for example, to a paper originally comprising both the coupling-component and diazonium salt and developed by treatment with an alkaline solution or with gaseous ammonia.

The inorganic reducing agent should be one which does not decompose the diazonium compound or the dyestuff produced therefrom, or, at least, does not so attack these substances in a reasonable time.

The reducing agent may be a hypophosphite or thiosulphate or a combination of such reagents. Ammonium sodium, and potassium hypophosphites are examples of hypophosphites which may be employed and sodium and potassium thiosulphates are examples of thiosulphates suitable for the purpose. These latter reagents by themselves have, however, generally been found of comparatively limited application and to be far less effective than hypophosphites. The preferred reducing agent is sodium hypophosphite.

These reducing agents may be applied in aqueous solution, and it has been found that a solution, for example, of sodium hypophosphite of a strength of 20 per cent, is not only very effective in preventing subsequent discolouration of the background, which practically retains the original colour, but does not attack the diazonium salt in a reasonable time for completion of coupling or the azo-dyestuff produced therefrom.

The solution may comprise a substance which will produce a modification of the dye colour, and/or increase the stability to light and such substance may itself be the reducing agent.

For example, a paper developed with an alkaline solution of $\beta$-naphthol for example, a solution of the composition hereinafter described, is sponged over with a 5 p. c. solution of stannous chloride containing a 2 p. c. of hydrochloric acid. The colour of line changes to purple, and the background is rendered less sensitive to the discolouring action of light.

Or, as a further example, a paper developed with an alkaline solution of $\alpha$-naphthol is sponged with an aqueous solution of 1% oxalic acid. The line turns from a brown to an olive green and the stability of the background to light is increased.

The stability towards light and air of such papers or the like can also be prolonged by applying to the surface of the print after the first coupling has commenced a neutralizing agent for alkali, for example, the solution of an acid or acid salt or salt of ammonium, for the purpose of destroying excess of alkali. Such application may be made before, after or concurrently with the treatment with the reducing agent.

Examples of suitable acids and acid salts are oxalic, tartaric and citric acids, and sodium metabisulphite. Ammonium chloride is both a convenient and satisfactory ammonium salt.

A solution of oxalic acid of about 3 per cent strength has been found convenient and effective. Dilute mineral acids may also be employed, but they are not generally to be recommended as they tend to act upon paper in course of time causing it to perish, a drawback which may be obviated if desired by a subsequent treatment with a dilute volatile alkali, such as ammonia.

This acid solution may also comprise substances which modify (increase) the intensity of the coloured dyestuff which is formed by the first coupling.

A mild reducer may also be applied to the print in a varnish medium, whereby the surface of the print is better protected than by varnish alone. A solution of oxalic acid of 0.5 p. c. by weight is suitable, or a saturated solution of sodium hypophosphite in an alcoholic solution of a gum-resin.

In carrying the invention into effect in one way a paper sensitized with a diazonium compound was developed by sponging over with a solution of the following compositions.

|  | Parts by weight |
|---|---|
| $\beta$-naphthol | 0.6 |
| Trisodium phosphate (crystals) | 4.5 |
| Sodium hypophosphite | 7. |
| Sodium thiosulphate | 5. |
| Water | 100. |

Claims:

1. A process for preventing deterioration of diazotypes which comprises treating the diazotype paper after exposure with an alkali hypophosphite.

2. A process for preventing deterioration of diazotypes which comprises treating the diazotype paper after exposure with sodium hypophosphite.

3. A process for preventing deterioration of diazotypes which comprises treating the diazotype paper after exposure with a solution containing a reagent selected from the group comprising alkali thiosulphates, alkali bisulphites, ammonium chloride, oxalic acid, tartaric acid, citric acid, and stannous chloride with hydrochloric acid.

4. The process recited in claim 3 in which the diazotype paper is treated after development by coating the same with a varnish containing the selected reagent.

HUMPHREY DESMOND MURRAY.